United States Patent
Shin et al.

(10) Patent No.: US 6,985,528 B2
(45) Date of Patent: Jan. 10, 2006

(54) APPARATUS AND METHOD FOR ENCODING AND DECODING MOVING PICTURE USING WAVELET TRANSFORMATION AND MOTION ESTIMATION

(75) Inventors: Jong Keun Shin, Kumi-Si (KR); Yeong Ho Ha, Daegu (KR); Ho Keun Lee, Daegu (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/323,761

(22) Filed: Dec. 20, 2002

(65) Prior Publication Data

US 2003/0118108 A1 Jun. 26, 2003

(30) Foreign Application Priority Data

Dec. 20, 2001 (KR) ................. 10-2001-0081620

(51) Int. Cl.
*H04N 7/12* (2006.01)

(52) U.S. Cl. ............................. 375/240.16; 375/240.19
(58) Field of Classification Search ............ 375/240.16, 375/240.19; 348/402.1, 413.1, 416.1
See application file for complete search history.

(56) References Cited

U.S. PATENT DOCUMENTS 5,701,160 A * 12/1997 Kimura et al. ......... 375/240.14
5,748,240 A * 5/1998 Carr et al. ............. 375/240.01
6,208,692 B1 * 3/2001 Song et al. ............. 375/240.19
6,496,607 B1 * 12/2002 Krishnamurthy et al. ... 382/282
6,560,371 B1 * 5/2003 Zhang et al. ................ 382/240

* cited by examiner

Primary Examiner—Jeffery Hofsass
Assistant Examiner—George Bugg
(74) Attorney, Agent, or Firm—Fleshner & Kim, LLP

(57) ABSTRACT

An encoding and decoding apparatus using a wavelet transformation and motion estimation is disclosed. The apparatus includes an input module for receiving an image data, a wavelet module for wavelet-transforming the image data received through the input module, an estimation/compensation module, a storage module for storing the image data being transmitted from the input module and transmitting the stored data in a request from the respective modules, an output module for outputting one bit stream by coupling the data being inputted from the wavelet module and a data corresponding to the motion vector being inputted from the storage module, and a control module for controlling operations of the respective modules. According to the present invention, though memories of small amount are used, whole image can be wavelet-transformed and a motion of a block can be estimated in real time when the encoding and decoding a moving picture at real time.

36 Claims, 16 Drawing Sheets

FIG. 10b
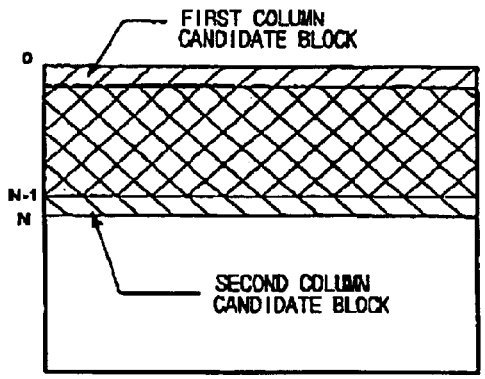
FIG. 11
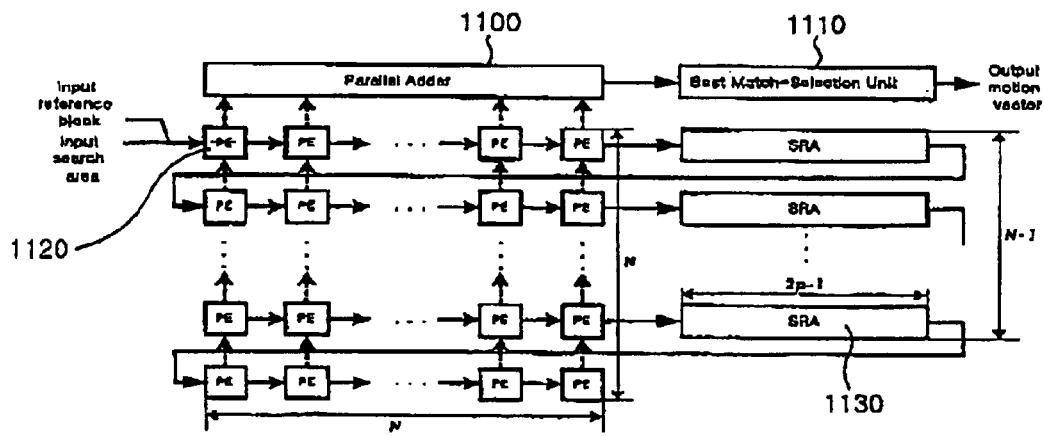
FIG. 12

(a)

(b)

(c)

|  | 0 | 64 | 127 | 191 | 255 | 319 | 383 | 447 | 511 |
|---|---|---|---|---|---|---|---|---|---|
| SRAM1 | | Y1_cur | Y1_prev | C1_cur | C1_prev | Y2_cur | Y2_prev | C2_cur | C2_prev |
| SRAM2 | | Y1_cur | Y1_prev | C1_cur | C1_prev | Y2_cur | Y2_prev | C2_cur | C2_prev |
| SRAM3 | | Y1_cur | Y1_prev | C1_cur | C1_prev | Y2_cur | Y2_prev | C2_cur | C2_prev |
| SRAM4 | | Y1_cur | Y1_prev | C1_cur | C1_prev | Y2_cur | Y2_prev | C2_cur | C2_prev |

(a)

(b)

APPARATUS AND METHOD FOR ENCODING AND DECODING MOVING PICTURE USING WAVELET TRANSFORMATION AND MOTION ESTIMATION

This application claims the benefit of Korean Patent Application No. P2001-81620 filed on Dec. 12, 2001, which is hereby incorporated by reference.

BACKGROUND OF THE INVENTION

1. Field of the Invention

The present invention relates to an apparatus for encoding and decoding a moving picture using wavelet transformation and motion estimation, and more particularly, to an apparatus and method for encoding and decoding a moving picture, which is capable of increasing compressibility of a moving picture by realizing performing motion estimation in units of blocks while processing wavelet transformation for an overall image as a system.

2. Discussion of the Related Art

Generally, a large amount of memory is necessary in the case of applying a wavelet transformation method, which is capable of encoding a still image in high efficiency, to a moving picture. Also, it takes a long time to estimate motion of a moving picture. Therefore, it takes a long time and a large amount of memory to use the above encoding and decoding method when processing a moving picture in real time. Accordingly, it is difficult to apply the above encoding and decoding method to a large screen, such as a plasma display panel (PDP).

Also, data is processed in units of blocks according to motion estimation, while the overall image is processed by a wavelet transformation method. Therefore, it is difficult to simultaneously process the overall image and the data in units of blocks in real time.

SUMMARY OF THE INVENTION

Accordingly, the present invention is directed to an apparatus and method for encoding and decoding a moving picture using wavelet transformation and motion estimation that substantially obviate one or more problems due to limitations and disadvantages of the related art.

An object of the present invention is to provide an apparatus and method for encoding a moving picture having high compressibility on the basis of wavelet transformation including motion estimation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the object and other advantages in accordance with the purpose of the invention as embodied and broadly described herein, there is provided an apparatus for encoding moving picture by using wavelet transformation and motion estimation, comprising an input module for receiving original image data; a wavelet module for wavelet-processing the data received through the input module; a motion estimation module for obtaining a motion vector; a motion compensation module for compensating motion by using the motion vector; a storage module for storing data input from the respective modules and transmitting the stored data according to the request from the respective modules; an output module for outputting one bit stream by coupling the data being inputted from the wavelet module with data corresponding to the motion vector being inputted from the storage module; and a control module for controlling operations of the respective modules.

The input module preferably comprises an input buffer and output buffer. The input buffer preferably transmits the original image data being inputted into the input module to the storage module. The output buffer preferably reads data corresponding to the difference signal data between an original image input from the storage module and a decoded image, and preferably transmits the corresponding difference signal data to the wavelet module.

The motion estimation module comprises one or more input buffers for storing data input from the storage module, an input buffer controller for controlling an output sequence of the data stored in the input buffer, a delay for delaying an data output from the input buffer according to the input buffer controller, a multiplexer for transmitting data outputted from the delay, and a motion estimator for obtaining the motion vector by processing data outputted from the multiplexer.

The motion compensation module comprises an input buffer for receiving data of a macro block which is stored in the storage module of which the address created by the motion vector, a processing element for alternately receiving data of a previous frame and data of a current frame and obtaining a difference between the inputted data, and an output buffer for outputting a result of the processing element in order for storing the result in the storage module.

A moving picture decoding apparatus according to another aspect of the present invention, using motion estimation based on block and wavelet transformation based on a frame for decoding an image signal inputted by being encoded in one bit-stream type. The moving picture decoding apparatus comprises an input module for receiving the encoded image signal of the one bit-stream type; a wavelet module for receiving a difference signal between the image signals from the input module and reversely wavelet-transforming the difference signal; a FIFO for storing a signal outputted from the wavelet module; a storage module to which a motion vector among the image signal is transmitted from the input module and the reverse-wavelet-transformed difference signal is transmitted from the FIFO; a motion compensation module for compensating motion by using the motion vector and the difference signal transmitted from the storage module; and an output buffer for finally outputting an image signal decoded by the motion compensation module received from the storage module.

According to the present invention, when encoding and decoding a moving picture in real time, it is possible to perform wavelet transformation for an overall image and to perform motion estimation for blocks in real time while using a small amount of memory.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 10A and 10B are screen block diagrams illustrating overlap of data during the search for motion estimation using the overall region search algorithm;

FIG. 11 is a block diagram illustrating a motion estimator of a motion estimation module according to the present invention;

FIGS. 12 and 13A to 13C sequentially illustrate motion estimation procedures according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
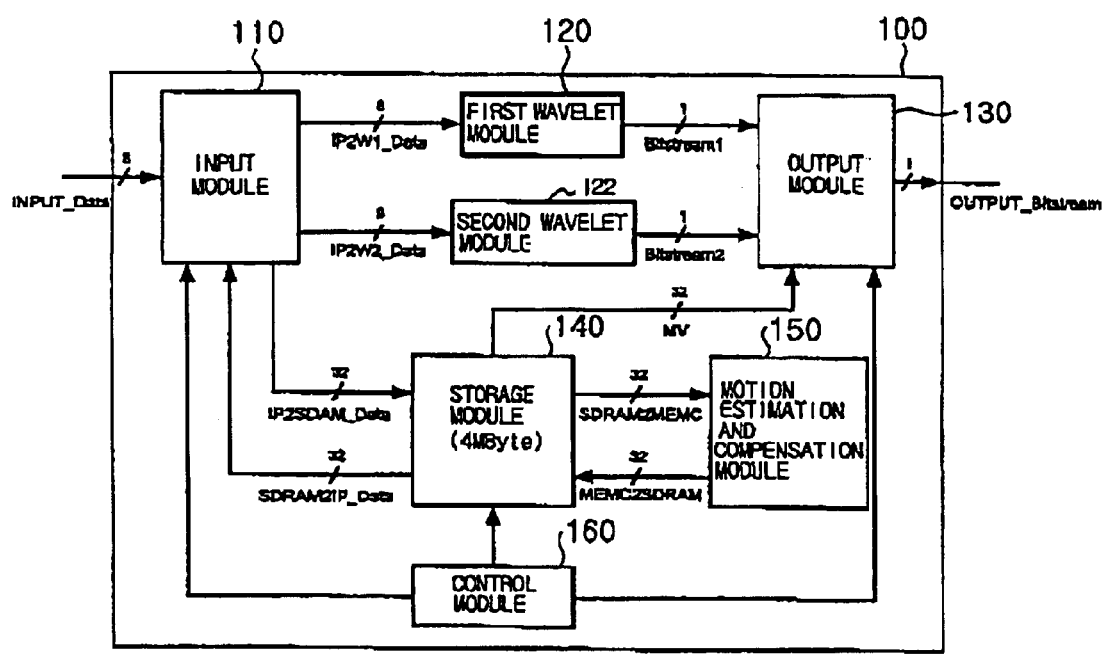
FIG. 1 is a block diagram schematically illustrating a moving picture encoding apparatus according to the present invention.

FIG. 1 is a block diagram illustrating a moving picture encoding apparatus using wavelet transformation and motion estimation according to the present invention.

Referring to FIG. 1, a moving picture encoding apparatus 100 according to the present invention includes an input module 110, to which an original image is input; a motion estimation and compensation module 150 for motion estimation and compensation; first and second wavelet modules 120 and 122 for performing wavelet transformation; a control module 160 for controlling operations of the respective modules; a storage module 140 for storing data created by the respective modules and transmitting the data to corresponding modules at a necessary time; and an output module 130 for outputting a finally created bit stream.

According to the moving picture encoding apparatus 100 according to the present invention, the motion estimation and compensation module creates an image of a P mode frame through motion estimation and compensation and stores the image in the storage module, while a wavelet module processes a sheet of I mode frame. When an operation for the I mode frame is completed by the wavelet module, the P mode frame stored in the storage module is transmitted to the wavelet module through an input module. Data and a motion vector respectively transmitted from the wavelet module and the storage module are converted into a bit stream and are finally output.

The moving picture encoding apparatus 100 according to the present invention includes the storage module 140 for temporarily storing data items generated by the respective modules and for providing the stored data items to corresponding modules so that other modules can use the data items for encoding the next frame.

The storage module 140 must process a large amount of data. The data width in the input and output modules and the motion estimation and compensation module according to the present invention is eight bits. Accordingly, time scheduling of the storage module can be easily performed by making the data width of the storage module 32 bits. As a result, in order to interface the moving picture encoding apparatus 100 with the storage module 140, data width must be converted. Therefore, the input module 110 of the moving picture encoding apparatus 100 converts an input image having data width of 8 bits into an input image having data width of 32 bits and stores the converted input image in the storage module. Also, the input module 110 converts data having data width of 32 bits brought from the storage module into data of 8-bit width and transmits the data to two wavelet modules.

The storage module 140 performs time scheduling in order to smoothly give data to and take data from the respective modules. The time scheduling of the storage module is managed by the control module. The control module divides an operation mode into an I mode representing an original image and a P mode representing motion and a difference image. The control module generates the address of the storage module and a control signal for each module according to the corresponding modes. The I mode "Intra Picture" is individually performed at every frame during continuous compression of an image. The P mode "Predictive Picture" compresses an image using a difference between a previous image and a current image. In the moving picture encoding apparatus according to the present invention, the wavelet module receives all of the images of a frame and processes the images, while the motion estimation and compensation module estimates motion in units of 16×16-macro blocks. Accordingly, the control module must control time scheduling between the respective modules.

Because the moving picture encoding apparatus according to the present invention basically performs the P mode after the I mode, the motion estimation and compensation module creates a P mode frame image through motion estimation and compensation and stores the image in the storage module, while the wavelet module processes an I mode frame. When an operation for an I mode frame is completed by the wavelet module, data for the P mode frame stored in the storage module is transmitted to the wavelet module through the input module. At this time, the storage module is controlled in units of macro blocks. Therefore, when an input image is 720×480, 675 macro block unit times are necessary in order to process one frame.

The output module of the moving picture encoding apparatus according to the present invention mixes data received from the wavelet module with a motion vector value received from the storage module, converts the resultant into a bit stream, and finally outputs the bit stream.

The structures and operations of the respective elements of the moving picture encoding apparatus according to the present invention will now be described in detail with reference to the attached drawings.

Figure 2:
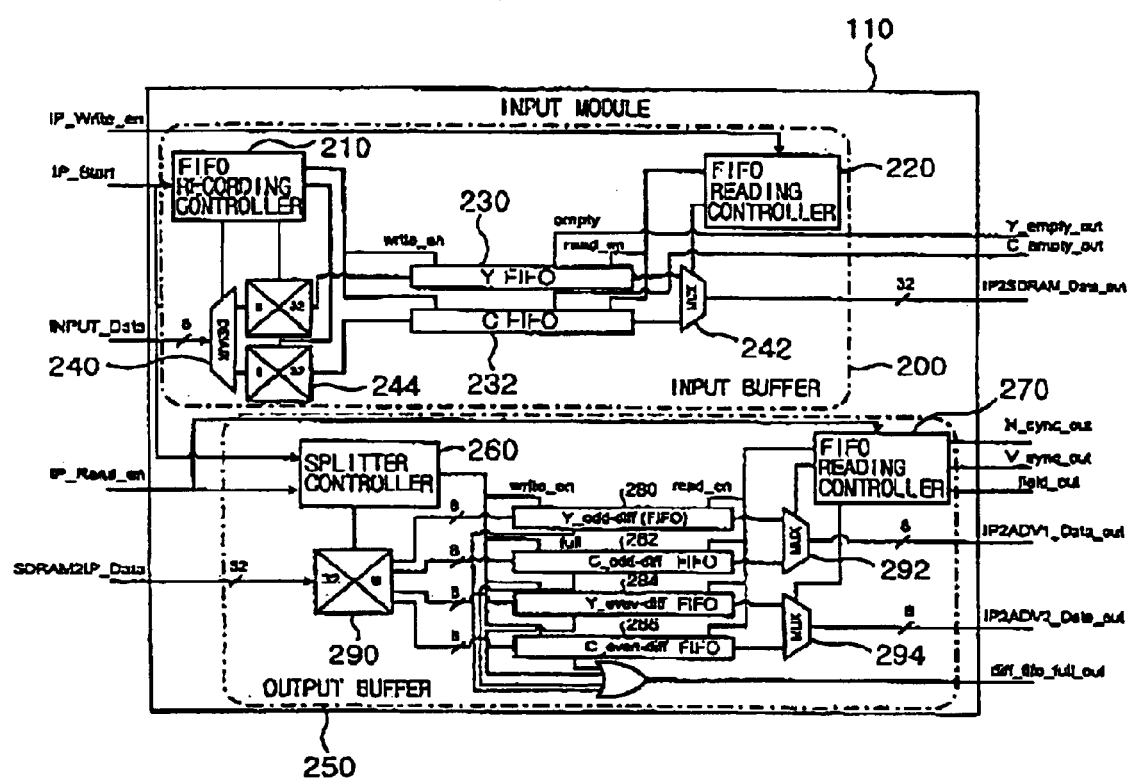
FIG. 2 is a block diagram illustrating an input module of the moving picture encoding apparatus according to the present invention.

FIG. 2 is a block diagram illustrating the input module 110 of the moving picture encoding apparatus according to the present invention.

Referring to FIG. 2, the input module 110 includes an input buffer 200 and an output buffer 250. The input buffer 200 of the input module 110 transmits original image data input from the outside and stores the original image data. The output buffer 250 brings motion-estimated data from the storage module and transmits the data to the wavelet module according to the control module.

The input buffer 200 and the output buffer 250 of the input module 110 include first in first outs (FIFO) and one or more controllers for controlling the inputs and the outputs of FIFOs. An input signal corresponding to an original image input to an input buffer has the CCIR601 format and each of Y, Cb, and Cr has a size of 8 bits. The input signal is sent to the storage module in units of 32 bits. At this time, while communication with the storage module is synchronized at 108 MHz, the input signal operates in 6.75 MHz during the input operation of the input buffer and operates in 27 MHz during the output operation of the output buffer. Accordingly, the FIFOs used in the input module must be formed of FIFOs using an asynchronous independent input and output clock.

The structure and the operation of the input buffer and the output buffer of the input module will now be sequentially described.

The input buffer 200 stores data of 720×480 corresponding to real data from input data of 858×525 in a buffer and transmits the data of 720×480 to the storage module 140. At this time, input data has the CCIR601 format and each of Y, Cb, and Cr has a size of 8 bits. The input buffer separates brightness (Y) data and chrominance (c) data from input data, converts input data of 8 bits to 32 bits, stores the input data of 32 bits in the FIFO, and transmits the data of 32 bits to the storage module 140.

The input buffer 200, as illustrated in FIG. 2, includes a FIFO recording controller 210, a FIFO reading controller 220, a brightness FIFO 230, a chrominance FIFO 232, a multiplexer 242, a demultiplexer 240, and 8-to-32 bit converter 244.

Figure 4:
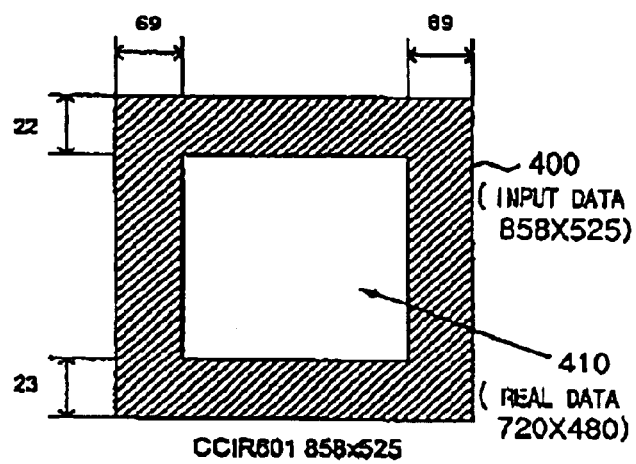
FIG. 4 is a data block diagram illustrating a structure of input data input to the input module.

The input module 140 operates only when the IP_start signal input to the FIFO recording controller 210 is '1'. The input data input to the input module is formed as illustrated in FIG. 4 and is formed of 858×525 according to the CCIR601 format (see like reference numeral 400 of FIG. 5). FIGS. 6A to 6C illustrate horizontal and vertical blanking times of the input data.

Figure 5:
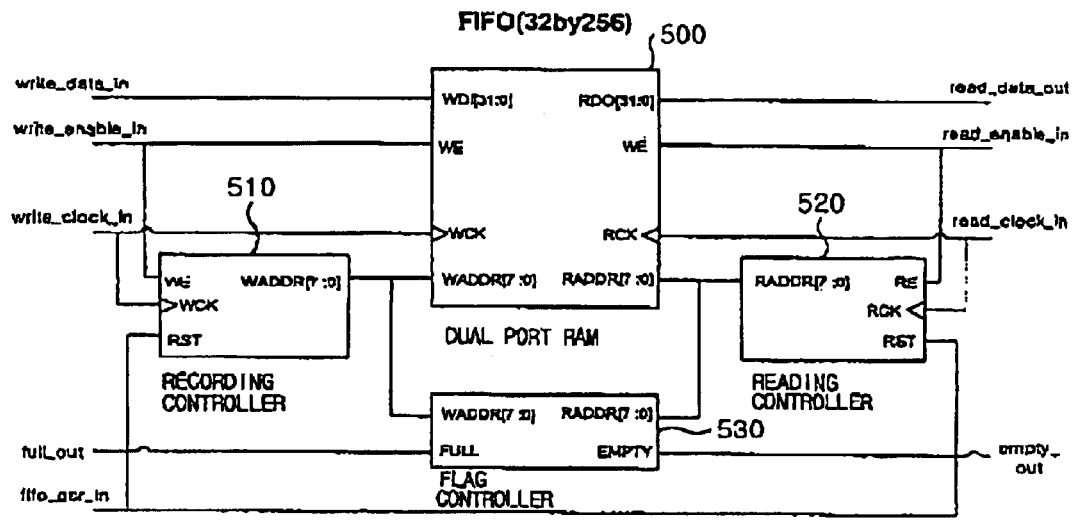
FIG. 5 illustrates comparison of the input data input to the input module with real data.
Figure 6A:
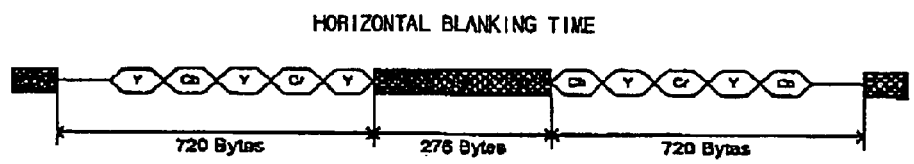
FIGS. 6A to 6C are block diagrams illustrating horizontal and vertical blanking times of the input data input to the input module.
Figure 6B:
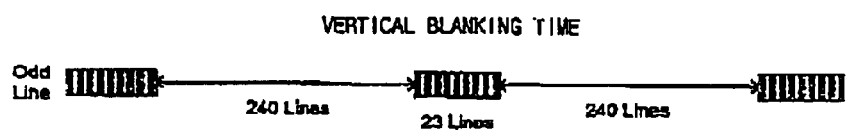
Figure 6C:

As illustrated in FIG. 5, only data of 720×480, which is real data (410 of FIG. 5), is extracted from input data (400 of FIG. 5). Thus, extracted data is in the form where Y data in the form of 4:2:2 are mixed with Cb and Cr data. Therefore, a procedure of classifying the Y data from the C data is necessary. At the same time, input data of 8 bits is made to input data of 32 bits. Thus formed brightness and chrominance data items are recorded in the brightness FIFO 230 and the chrominance FIFO 232, respectively.

When the IP_write_en signal input to the input buffer 200 is '1', brightness and chrominance data items recorded in the brightness FIFO 230 and the chrominance FIFO 232, respectively, are sequentially output.

Because data input continuously occurs from when the encoding apparatus actually being operation, an appropriate amount of data items stored in FIFOs in the input buffer must be extracted. According to the encoding apparatus of the present invention, because the input and output of the storage module 140 are synchronized with a frequency of 108 MHz with 32-bit data width, data items do not overflow from FIFOs in the input buffer. To the contrary, the FIFOs are empty, which is controlled by the FIFO reading controller 220 of the input buffer 200.

Figure 3:
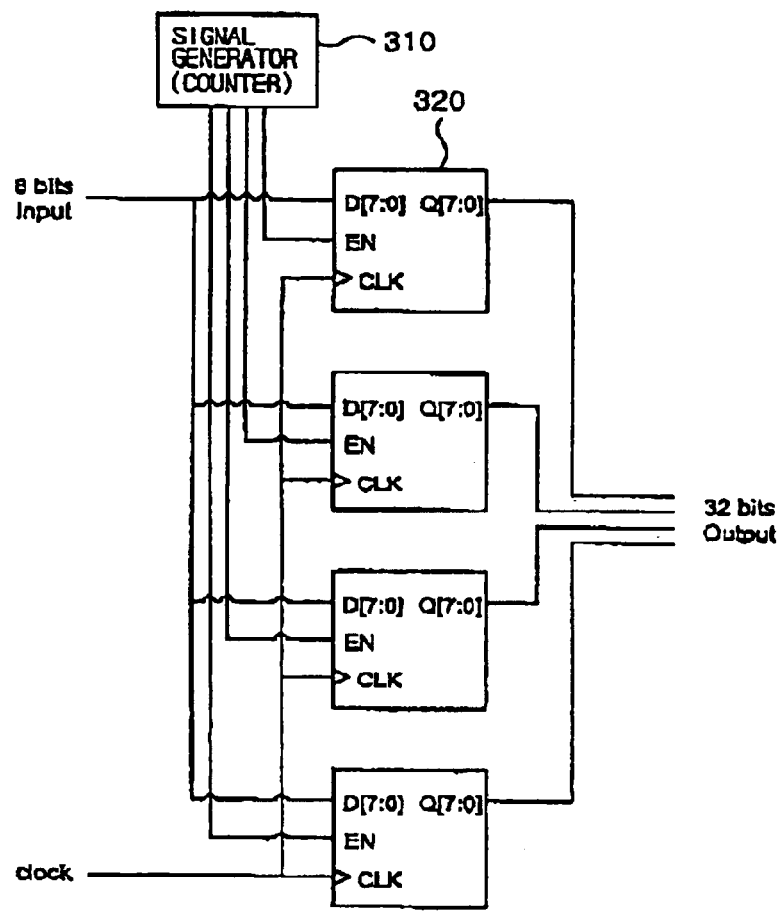
FIG. 3 is a block diagram illustrating a counter used for a first in first out (FIFO) recording controller of the input module.

The FIFO recording controller 210 of the input buffer controls the operation of the demultiplexer 240 and the 8-to-32 bit converter 244 and controls the recording of the FIFOs in the input buffer 200. At this time, only real data is extracted, excluding a blanking signal among the input data items, using a counter. FIG. 3 is a circuit diagram illustrating the counter selecting real data from input data. Referring to FIG. 3, a signal generator 310 only enables a D flip flop 320 for every clock using the counter synchronized with the clock. Accordingly, when a counter makes one full cycle, an output of 32 bits is completed.

The FIFO reading controller 220 in the input buffer controls the operation of the multiplexer 242 and controls the data output from the FIFOs. The FIFOs 230 and 232 in the input buffer 200 only controls when the status is "empty" and not "full". Because the inputs of the FIFOs 230 and 232 are synchronized with the frequency of 6.75 MHz and the outputs are synchronized with the frequency of 108 MHz, the FIFOs are empty upon the lapse of a uniform time. Accordingly, once an "empty" signal is observed, outputs from the FIFOs are stopped until the IP_write_en signal of the next period becomes '1'.

The output buffer 250 of FIG. 2 converts a difference signal of the storage module 140 transmitted in units of 32 bits into a difference signal in units of 8 bits and sends the difference signal to the wavelet modules 120 and 122. The output buffer 250 includes a splitter controller 260, a 32-to-8 bit converter 290, a FIFO reading controller 270, a brightness odd FIFO Y_odd_FIFO 280, a chrominance odd FIFO C_odd_FIFO 282, a brightness even FIFO Y_even_FIFO 284, a chrominance even FIFO C_even_FIFO 286, and multiplexers 292 and 294.

When an IP_start signal and an IP_read_en signal are '1', the output buffer 250 distinguishes data of an odd line from data of an even lines while cutting the difference signal data in units of 32 bits transmitted from the storage module 140 in units of 8 bits. The output buffer 250 classifies the brightness Y data from the chrominance (c) data. Thus, classified $Y_{even}$, $C_{even}$, $Y_{odd}$, and $C_{odd}$ data items are stored as FIFOs 280, 282, 284, and 286, respectively. When the IP_read_en signal is '1', the data stored in the FIFOs continuously transmits data items of the odd line and the even line to the two wavelet modules 120 and 122, respectively. In order to interface with the wavelet module, the inputs of the FIFOs are synchronized with the frequency of 108 MHz and the outputs are synchronized with the frequency of 27 MHz. The structure of the FIFO used for the output buffer is the same as that of the input buffer, excluding data width of 8 bits and a dual port RAM of 128 depths.

Since the output buffer 250 continuously outputs data after the encoding apparatus begins operation, problems occur when an inappropriate amount of data is stored in the FIFOs. However, according to the moving picture encoding apparatus of the present invention, the FIFOs are not empty, because the input and the output of the storage module 140 are synchronized with the frequency of 108 MHz with the data width of 32 bits. To the contrary, the data items overflow from the FIFOs. In order to prevent this, the full signal output from the splatter controller 260 of the output buffer is observed. Once "full" status occurs, inputs to the FIFOs are stopped until the IP_read_en signal of the next period becomes '1'. The FIFO reading controller 270 in the output buffer controls the outputs of FIFOs 280, 282, 284, and 286, controls the multiplexers 292 and 294 for selecting the brightness and chrominance data to be input to the wavelet module, and generates a horizontal synchronization signal, a vertical synchronization signal, and a field signal suitable for the CCIR601 format requested by the wavelet module.

Figure 7:
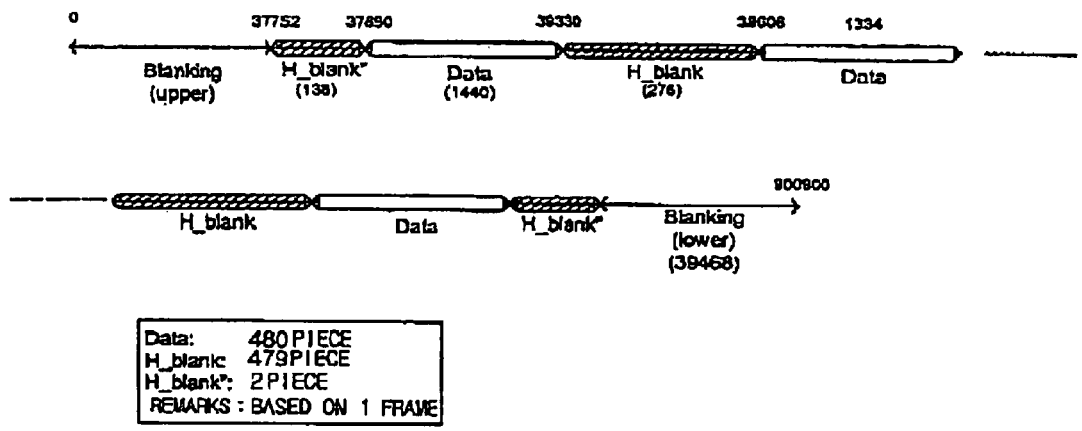
FIG. 7 is a block diagram illustrating FIFO of input and output buffers in the input module.

FIG. 7 is a block diagram illustrating the inside of the FIFO. The structure and the operation of the FIFO in the input module will now be described in detail with reference to FIG. 5.

The FIFO is input in synchronization with the frequency of 6.75 MHz and is output in synchronization with the frequency of 108 MHz in order to interface with the storage module 140. The FIFO, as illustrated in FIG. 5, includes a dual port RAM 500, a recording controller 510, a reading controller 520, and a flag controller 530.

The dual port RAM 500 is preferably designed to simultaneously perform reading and writing for a memory and to have 32 bit data width and 256 depths.

The recording controller 510 in the FIFO is a module for generating an address for recording data in the dual port RAM 500. A gray code is used as an address generation code.

The reading controller 520 in the FIFO is a module for generating an address for reading data from the dual port RAM 500 Also, the gray code is used as an address generation code.

The flag controller 530 is a module for monitoring and announcing whether the dual port RAM 500 is full or empty.

The motion estimation and compensation module 150 in the moving picture encoding apparatus according to the present invention includes a motion estimation module and a motion compensation module. The motion estimation module detects a motion vector by performing an algorithm of a macro block on the current frame, searching for the most similar block to the previous frame in a search region using only a brightness component. In one embodiment according to the present invention, an overall region search algorithm is used to search for the most similar block. The overall region search algorithm used for an embodiment of the present invention will now be described with reference to FIGS. 8A and 8B.

Figure 8A:
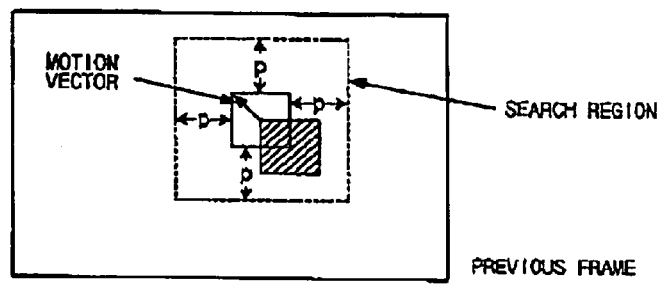
FIGS. 8A and 8B are block diagrams of previous and current frames illustrated in order to explain an overall region search algorithm for motion estimation.
Figure 8B:
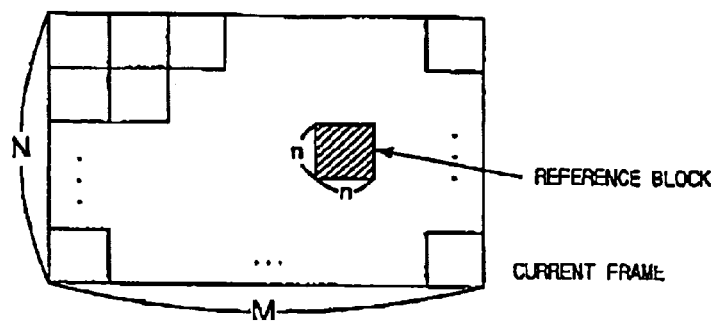

FIGS. 8A and 8B illustrate the previous frame and the current frame for explaining the overall search algorithm. Referring to FIGS. 8A and 8B, the current frame is divided into reference blocks each having a size of n×n. A predetermined search region in the previous frame is set for each reference block separated from the current frame. The search region in the previous frame includes $(2q+1)^2$ candidate blocks in a predetermined size (q) in vertical and horizontal directions from the position of the reference block. The candidate block optimally matching with a reference block is selected among the candidate blocks of the search region. The relative position of the block is determined as a motion vector.

In the above-mentioned overall region search algorithm, hardware is designed using a systolic array. In this method, an amount of repeated operations is reduced by appropriately using a shift register in a portion repeatedly operated in a block-matching algorithm. An operation result is output for each clock excluding an initial delay time. Therefore, it is possible to improve efficiency by reducing time wasted due to repeated operations.

In order to use the block matching algorithm using the systolic array, the moving picture encoding apparatus according to the present invention requires a front end of a systolic array, to which the reference block of the current frame and blocks in the search region of the previous frame can be sequentially input. Therefore, the motion estimation module of the moving picture encoding apparatus according to the present invention converts data items having 32-bit width transmitted from the storage module 240 into data items of 8-bit width that can be used for the motion estimation module.

Figure 9:
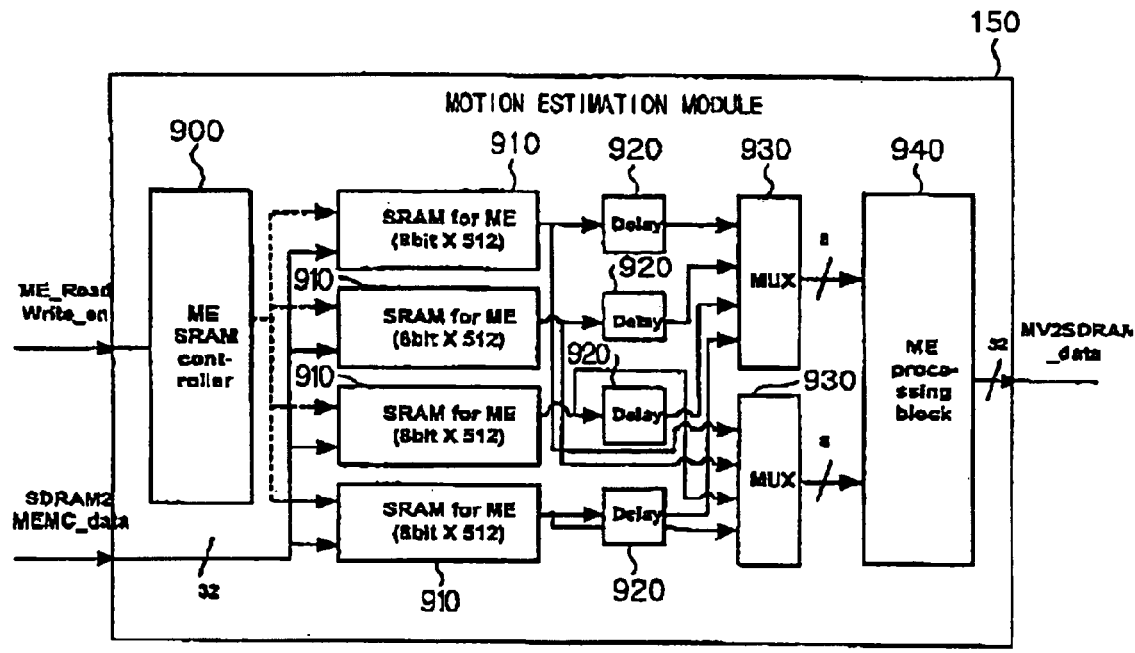
FIG. 9 is a block diagram illustrating a motion estimation module of a moving picture encoding apparatus according to the present invention.

FIG. 9 is a block diagram illustrating the motion estimation module according to the present invention. Referring to FIG. 9, the motion estimation module according to the present invention includes an input buffer 910 using SRAM that has four static memories, a delay 920, a multiplexer 930, a motion estimator 940, and an input buffer controller 900.

The input buffer 910 uses SRAM that has four static memories. Input and output are always separately performed in the input buffer 910. Therefore, it is not necessary to use the FIFOs. As a result, the capacity of the memory in the motion estimation module is also reduced. The input buffer 910 is controlled by the input buffer controller 900.

Data corresponding to the reference block of the current frame and the search region of the previous frame is input from the input buffer 910. After all of the input data items are stored in the input buffer, the data items are output to the delay 920 and the multiplexer 930 that are processing blocks for performing motion estimation in the order determined by the input buffer controller 900. Thus, output data is processed by the motion estimator 940 to obtain a motion vector. At this time, the motion estimator 940 searches for the optimal motion vector by performing the block-matching algorithm using the systolic array. Thus, the obtained motion vector as transmitted to the storage module 140.

Figure 10A:
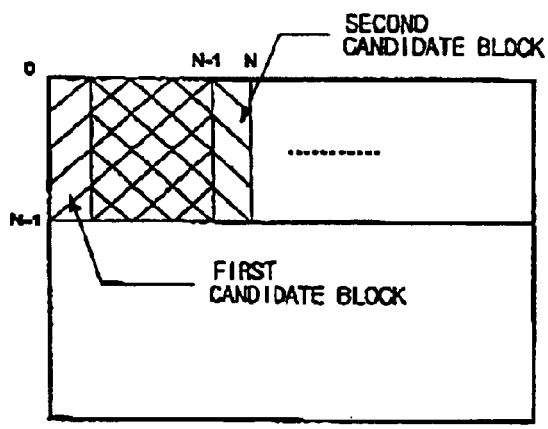

FIGS. 10A and 10B illustrate screens illustrating the overlap of data during the search for estimating motion using the overall region search algorithm. FIG. 11 is a block diagram illustrating the motion estimator of the motion estimation module.

A sequential input parallel processing structure for performing the block matching algorithm uses a shift register array in order to use overlapping of regular data flow of an overall search algorithm on the basis of a two-dimensional systolic structure. Data overlapping means that data once input to a system is input again. FIGS. 10A and 10B illustrate overlapping of data that exists in the overall region search block matching algorithm.

FIG. 10A illustrates overlapping between data of a candidate block used by a systolic structure as an overlapped region. The overlapped region of FIG. 10B means data overlapping between lines used for the present invention.

FIG. 11 is a block diagram schematically illustrating the motion estimator 940 in the motion estimation module 150 according to the present invention. As illustrated in FIG. 11, unlike a simple systolic structure, a two-dimensional systolic structure uses a set of a shift register array. The motion estimator 940 has a sequential input parallel processing structure for sustaining a parallel processing characteristic by a shift register array set connected to the right side of an operation device group by using the overlapping of data and by using only one input. Time spent on estimating the block motion is represented by the following Equation 1.

$$C=(2q+1)\times(2q+n)+(n+2q-1)\times(n-1) \quad \text{[Equation 1]}$$

wherein, C, q, and n represent time spent on estimating block motion, a motion estimation search region, and the size of a block, respectively.

In an embodiment of the moving picture encoding apparatus according to the present invention, the size of a reference block is set to be 16×16 and the search region is set to be a reference block±8, in order to estimate a motion vector after the lapse of 1031 clock pulses according to the clock signal of input data.

According to the sequential input parallel processing structure, operations are performed through a processing element denoted by reference number 1120 of FIG. 11 having the same size as the number of lengths of horizontal lines of the reference block. At this time, the width of the line of the processing element is the same as the length of the line of the reference block. The structure of overall processing elements has the same size as the reference block. The pixel value of the reference block is input to the shift register array formed of one or more shift registers. The input pixel value of the reference block is input to the processing element formed of n×n in the same shape. The data items of the search region undergo an operation for obtaining a difference value between the data items and the reference block, and an operation for adding the value transmitted below a processing element to the data items through the processing element and the shift register. The data items of the search region are then transmitted to the next processing element. At this time, a shift register array (SRA) has a width of (2p−1), which is the same as the width of the search region.

Procedures of moving search region data at each clock time zone will now be described. Specifically, a block having the size of 3×3 will be used as an example, with reference to FIGS. 12 and 13A to 13C.

Figure 13A:
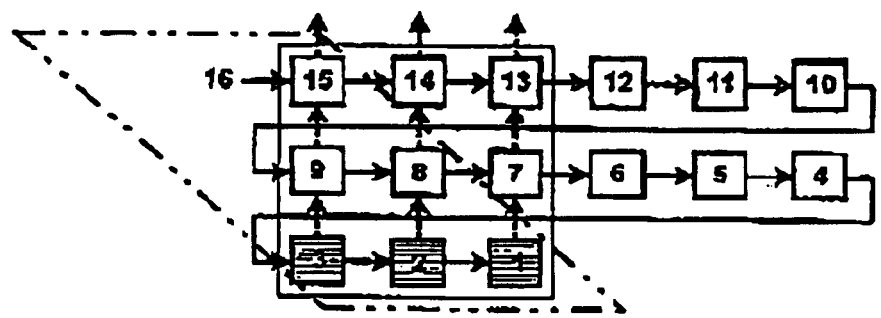
Figure 13B:
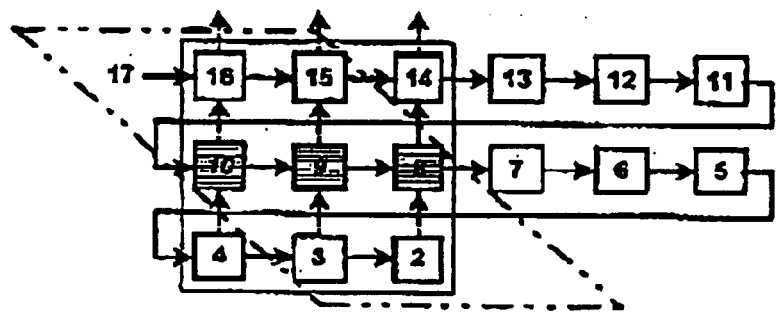
Figure 13C:
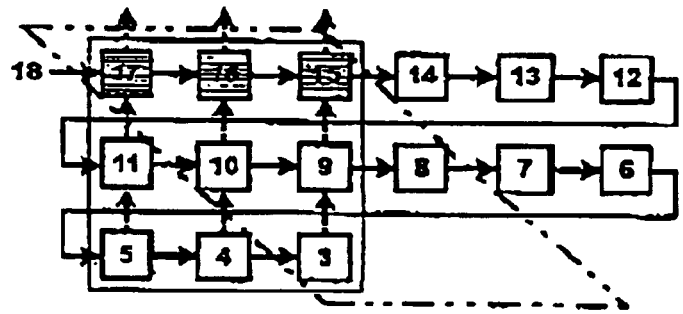

FIG. 12 illustrates procedures of moving data in the search region at each clock time zone in a block having the size of 3×3 according to the present invention. FIGS. 13a to 13C are diagrams expressing the position of data in a system at a specific time, which easily show the operation of a system. Data of FIG. 13A simultaneously processes three pixels after one clock. This result is accumulated with the calculation result of three pixels processed in FIG. 13B and is accumulated with the calculation of three pixels of FIG. 13C. As a result, a block having the size of 3×3 pixels is processed.

Figure 14:
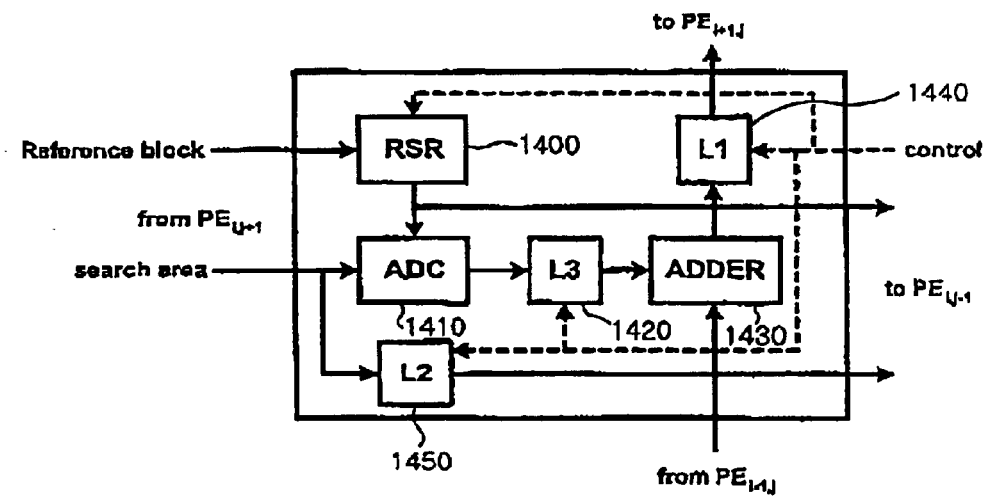
FIG. 14 is a block diagram illustrating a PE in the motion estimation module.

FIG. 14 is a block diagram illustrating the processing element (PE) 1120 used for the motion estimation module 150 of the moving picture encoding apparatus according to the present invention. The PE 1120 calculates an absolute difference value between data of the reference block and data of the search region and accumulates the data items. As illustrated in FIG. 14, the PE 1120 includes a reference input shift register 1400, an absolute difference computer (ADC) 1410, a first delay 1440, a second delay 1450, a third delay 1420, and a coupler 1430.

The RSR 1400 of the PE 1120 according to the present invention transmits reference blocks input for initial times to the next PE and transmits data on input reference blocks to the ADC 1410 when an operation starts, in order to perform an operation between the data and an input in the search region.

The ADC 1410 calculates an absolute difference between data on the reference block input from the RSR 1400 and data on the search region. The resultant value is input into the coupler 1430 through the third delay 1420. The coupler 1430 performs an accumulation function between the reference block and the data on the search region. The first delay 1440 and the second delay 1450 keep the data items transmitted from a previous PE during a clock and transmit them to the next PE. The third delay 1420 is used for synchronizing the ADC 1410 with the coupler 1430.

Figure 15:
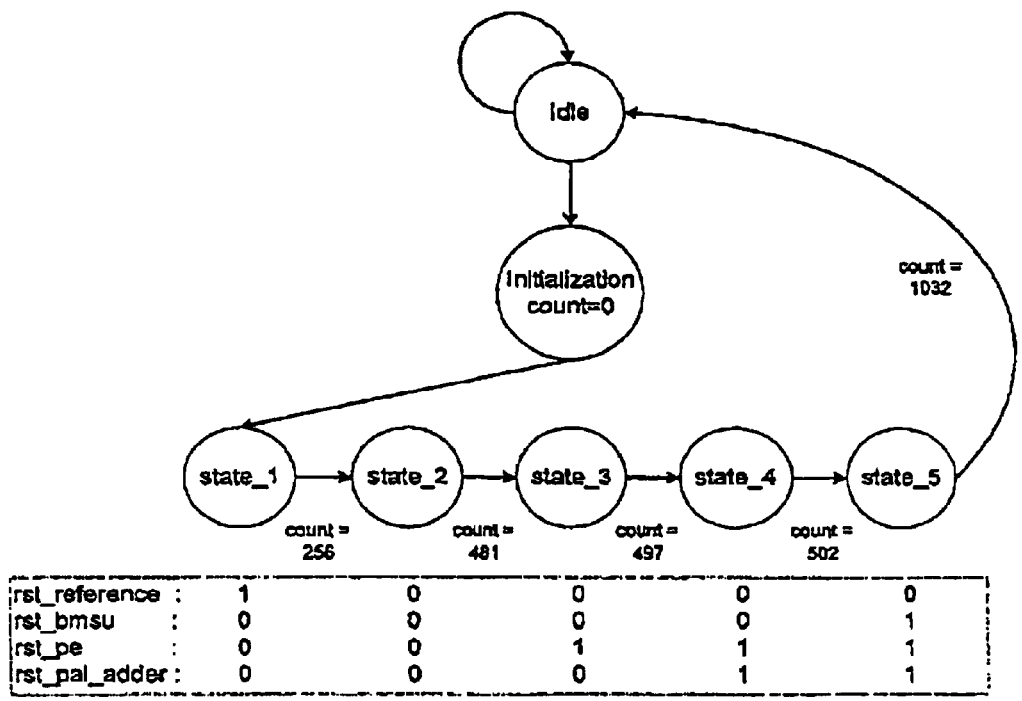
FIG. 15 is a state transition diagram illustrating a control signal in the motion estimation module.

FIG. 15 is a state transition diagram illustrating a control signal in the motion estimation module of the moving picture encoding apparatus according to the present invention.

As illustrated in FIG. 15, in a motion estimation module according to the present-invention, a state for creating a control signal is divided into five parts. An idle state where the control signal is not created and an initial state for initializing the control signal exist. The principle for creating the control signal in each state relates to the reset timing of each block of a sequential input parallel processing structure.

The motion estimation module of the moving picture encoding apparatus according to the present invention reads data from the storage module 140 and stores the data in the input buffer 910 (FIG. 9) in order to estimate motion. The input buffer converts the 32-bit data width input from the storage module into 8-bit data width, thereby allowing the data to be used by the motion estimation module (a), reducing the clock of the data transmitted in 108 MHz from the storage module 140 to 54 MHz (b), and outputting data according to the input order of the motion estimation module (c).

Figure 16:
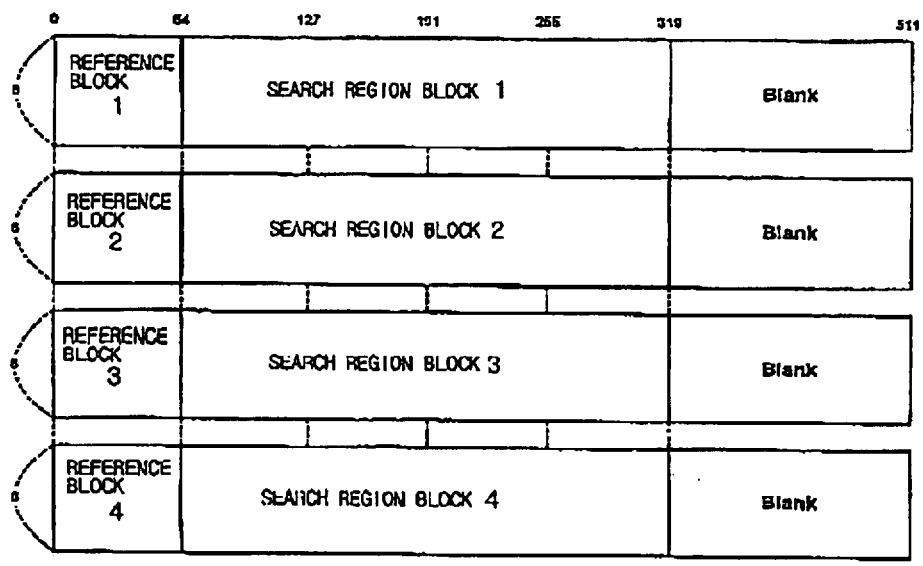
FIG. 16 is a memory map illustrating an input buffer in the motion estimation module.

The input buffer 910 in the above-mentioned motion estimation module must include capacity, which is capable of holding data required for estimating the motion of a macro block. To be more specific, a reference block is dependent upon the size of a macro block and the search region must be four macro blocks. Therefore, memory of the size of five macro blocks is necessary. Because a macro block requires a memory of 16×16=256 bytes, the overall input buffer requires 256×5=1280 bytes, in which 10240 bits correspond to the size of at least five macro blocks. Since the minimum size of a block RAM of Xilinx is 2048 bits and the 32-bit data input must be converted into 8-bit data input, eight block RAMs must be used. Therefore, the input buffer 910 in the motion estimation module according to the present invention uses four RAMs having the 8-bit data width and 512 addresses. FIG. 16 illustrates a memory map of four SRAMs used as the input buffer in the motion estimation module.

In order to fit the data input from the storage module 140 to the input order of the motion estimation and compensation module, a uniform data processing order is necessary. First, the reference block of the current frame and the blocks in the search region of the previous frame are simultaneously input to the motion estimation and compensation module during 64 clocks according to the frequency of 54 MHz by the size of the macro block formed of 256 bytes. After the input of the reference block and the input of the search region data of the size of the reference block are finished, the data of the remaining search region is input during the 256 clocks. At this time, when the data of the reference block and the data of the search region are simultaneously input, the data items output from four SRAMs 910 must be distributed using a multiplexer MUX 930 and a delay 920. Because the data items are input to the four SRAMs from top to bottom, the data must be sequentially input to the motion estimation module even though the data items are output at the same time. For the input of the data items to the motion estimation module, the multiplexer and the delay are arranged as illustrated in FIG. 9. The delay of the motion estimation module shown in. FIG. 9 is used to separate the reference block from the block of the search region because the reference block and the block of the search region are alternately output from the same SRAM. Thus separated data items are sequentially used as the input of the motion estimation module through the multiplexer. Because the motion estimation module must be input in 54 MHz, the SEL terminal of the multiplexer circulates in a 13.5 MHz period.

According to the storage module created by the motion vector created by the motion estimation module, data corresponding to eight macro blocks is input to the motion compensation module. Because real data for an overall image has the size of 720×480, it is difficult to estimate motion of all of the data items within a desired time. Therefore, motion estimation is performed only on an odd image of 720×2440. However, in order to compress data, processes of recovering motion for the overall image and obtaining a difference value are required. The processes of recovering the motion and of obtaining the difference value are necessary to a chrominance signal as well as a brightness signal. Therefore, in order to compensate for motion and to obtain a difference signal, a brightness signal of a previous image and a brightness signal of a current image corresponding to two macro blocks are necessary, respectively. The same requirements are needed for a chrominance signal. As a result, data of the size of a total of eight macro blocks is required. In order to input the data, 64×8=512 clocks are required on the basis of 108 MHz.

Figure 17:
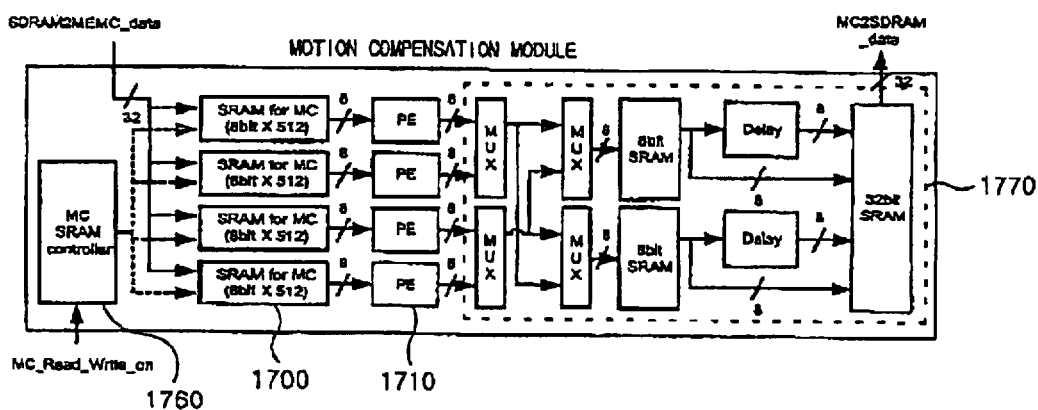
FIG. 17 is a block diagram illustrating a motion compensation module of the moving picture encoding apparatus according to the present invention.

FIG. 17 is a block diagram illustrating the motion compensation module of the moving picture encoding apparatus according to the present invention.

Referring to FIG. 17, the motion compensation module according to the present invention includes an input buffer 1700, a processing element (PE) 1710 for operating differences, and an output buffer 1770 for storing the result of the PE in the storage module 140.

In general, a static RAM, a SRAM is used as the input buffer 1700 of the motion compensation module. Because eight macro blocks must be stored and the 32-bit input data must be divided into 8-bit input data items, four SRAMs having 8-bit width and a size of 512 bits are necessary.

The data input to the motion compensation module is processed through the input buffer 1700 and the PE 1710. The data is then output to the storage module 140 through the output buffer 1770. At this time, in order to output the data to the storage module, the order of the data must be re-constructed. In order to re-construct the order of the data, the output buffer 1770 of the motion compensation module includes a multiplexer, a memory, and a delay, which will be mentioned later. The data items whose order is re-constructed by the components can be directly input from the input module to the wavelet module.

Figures 18, 19:
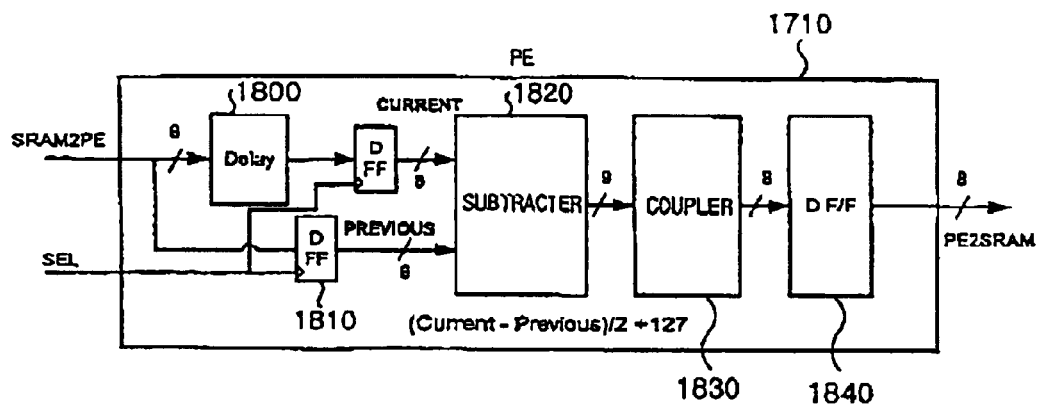
FIG. 18 is a block diagram illustrating a PE in the motion compensation module.
FIG. 19 is a memory map illustrating an input buffer in the motion compensation module.

FIG. 18 is a block diagram illustrating the PE 1710 included in the above-mentioned motion compensation module.

Referring to FIG. 18, the PE 1710 in the motion compensation module is formed by sequentially connecting a delay 1800, a latch 1810, a subtracter 1820, a combiner 1830, and a D-flip flop 1840 to each other. The PE in the motion compensation module creates a desired result by dividing input data items by each other using the delay 1800 and the latch 1810 and by obtaining a difference using the subtracter 1820 when data on a previous frame and data for the current frame are alternately input from the input buffer 1700 of the motion compensation module. At this time, the data is made to be a positive number of eight bits, in order for the input of the wavelet module to be used in eight bits. As a result, in order to fit the data to eight bits, the value obtained by subtracting the value of the previous frame from the current frame is divided by 2 and 127 is added to the resultant value. By doing so, the resultant value, which is in a range between −255 and +255, is converted into a value in a range between 0 and 254. When recovery is performed in consideration of this during the designing of a decoder, an error of ±1 is created, which is negligible in an image. Additionally, it is very advantageous to have a resultant value of eight bits during the use of a memory.

FIG. 19 illustrates a memory map of an input buffer included in the motion compensation module of the moving picture encoding apparatus according to the present invention.

Referring to FIG. 19, it is possible to know the memory map of the data items stored in the order of input in the input buffer of the motion compensation module according to the present invention. The input buffer in the motion compensation module can store eight macro blocks by including four SRAMs of 512 bytes, to thus have the size of 2048 bytes. When data is input from the storage module, the data is input in the order of "Y1_cur→Y1_prev→C1$_{cur→C1_}$prev→Y2_cur→Y2_prev→C2_cur→C2_prev". Accordingly, the PE can be more smoothly operated.

Also, like the input buffer in the motion estimation module, the motion compensation module uses four SRAMs as an input buffer, to thus divide 32-bit data input from the storage module into 8-bit data items. The time required for inputting data from the storage module 140 to the motion compensation module is 512 clocks on the basis of 108 MHz. In order to process the data, 512 clocks are required on the basis of the frequency of 54 MHz when the data is output. The data of the current frame and the data of the previous frame are alternately output to the PE in the order of "Y1→C1→Y2→C2".

Figure 20:
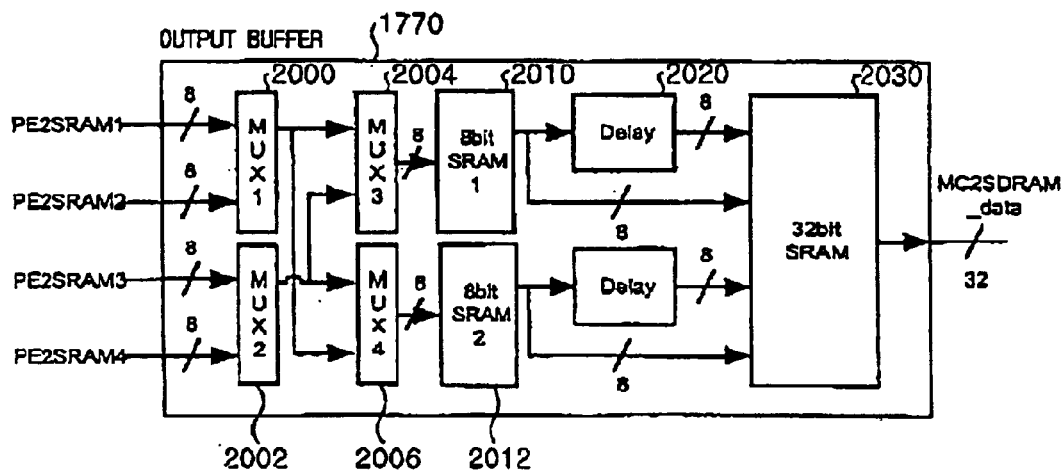
FIG. 20 is a block diagram illustrating an output buffer in the motion compensation module.

FIG. 20 is a block diagram illustrating the output buffer 1770 in the motion compensation module of the moving picture encoding apparatus according to the present invention.

Referring to FIG. 20, the output buffer 1770 in the motion compensation module according to the present invention includes four multiplexers 2000, 2002, 2004, and 2006, 8-bit first and second memories 2010 and 2012, two delays 2020, and a 32-bit third memory 2030. The output buffer 1770 changes the order of the resultant data simultaneously output from the four PEs, stores the data in 32 bits in the storage module 140, and outputs the control signal to the storage module when the control signal is input. The reason of changing the order of data is for effective use of data when the data is transmitted from the input module to the wavelet module. Therefore, the order of the data is changed when the motion compensated data is stored in the storage module. The outputs calculated by and output from the PE are adjusted to be input to the 32-bit SRAM in the order of Y1, C1, Y2, and C2.

The operation of the output buffer 1770 of the motion compensation module will now be described. A signal output from the PE is synchronized with a frequency of 27 MHz, is input to the output buffer, and is synchronized with the frequency of 54 MHz through the first and second multiplexers 2000 and 2002. By use of four multiplexers, the output buffer according to the present invention allows the signals Y1 and C1 input to the first memory 2010 and the signals Y2 and C2 input to the second memory 2012. At this time, the first and second memories use the 8-bit SRAM. Data that underwent such processes are stored in the first and second memories of eight bits, respectively. Only the data of Y1 and C1 is stored in the first memory 2010; and only the data Y2 and C2 is stored in the second memory 2012. Because the first and second memories 2010 and 2012 cannot fit the order desired by the resultant data output from the four PEs, the 32-bit data is input to a third memory 2030 by controlling an address and changing the order when the data is stored in the memory. The 32-bit data stored in the third memory 2030 slows down so as to be synchronized with the frequency of 27 MHz. The data is output in synchronization with a frequency of 108 MHz when the data items stored in the output buffer are output to the storage module.

Figure 21:
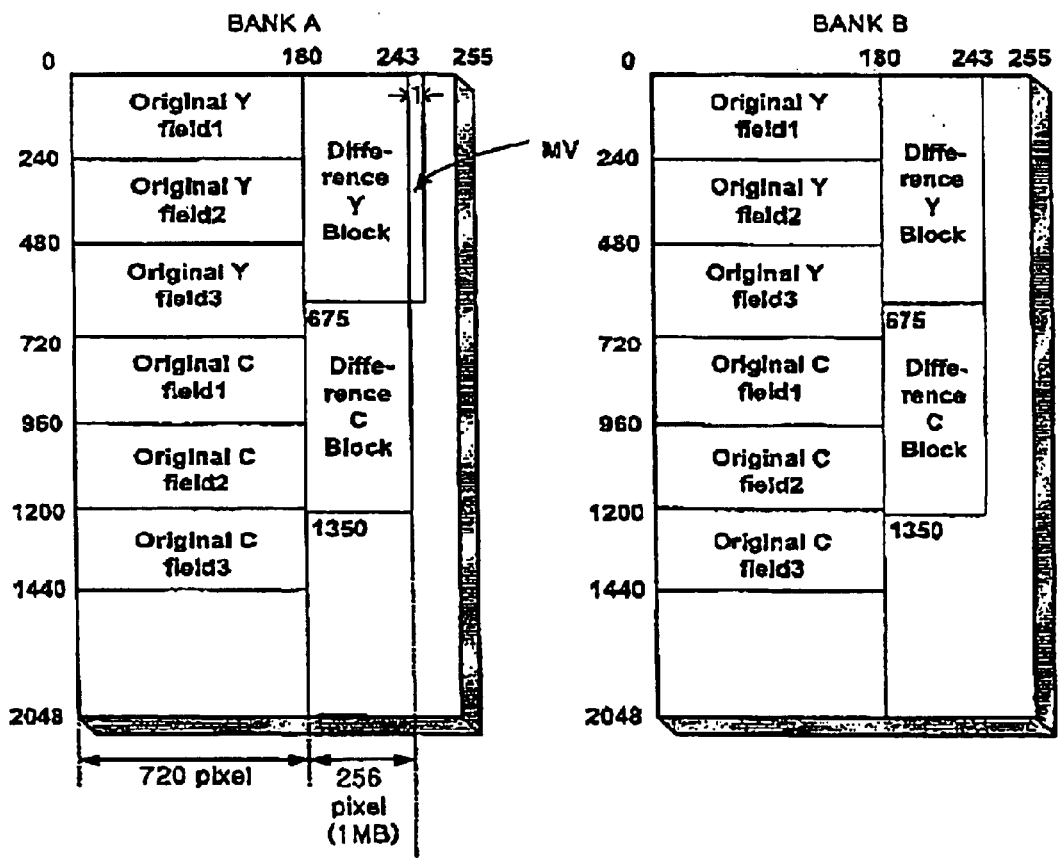
FIG. 21 is a memory map illustrating a storage module according to the present invention.

FIG. 21 illustrates a memory map of the storage module 140 of the moving picture encoding apparatus according to the present invention. The storage module 140 according to the present invention will now be described with reference to FIG. 21.

The storage module 140 according to the present invention is a memory of storing the data created by the overall system at a desired time and distributing the data to a corresponding module in the system. Therefore, the respective modules of the encoding apparatus according to the present invention are designed to communicate with the storage module and to control the data input and output from the storage module by the control module 160 (FIG. 1) of the encoding apparatus. In the moving picture encoding apparatus according to the present invention, as illustrated in FIG. 21, a synchronous graphic RAM (SGRAM) having two banks is preferably used as the storage module 140.

The storage module 140 secures a memory that can store image data for a frame input from an input module 110, image data for the previous two frames transmitted to the motion estimation and compensation module, data corresponding to a difference signal generated as a result of motion compensation, and data corresponding to a motion vector generated as a result of motion estimation.

Referring to FIG. 21, regions of storing image data input from the input module 110 are marked as "Original Y" and "Original C". Regions of storing data corresponding to a difference signal generated as a result of motion compensation are marked as "Difference Y block" and "Difference C block". According to the structure of the memory map, data items generated by the respective modules are alternately stored in two banks. Accordingly, it is possible to utilize the burst mode of the storage module to the maximum.

Figure 22:
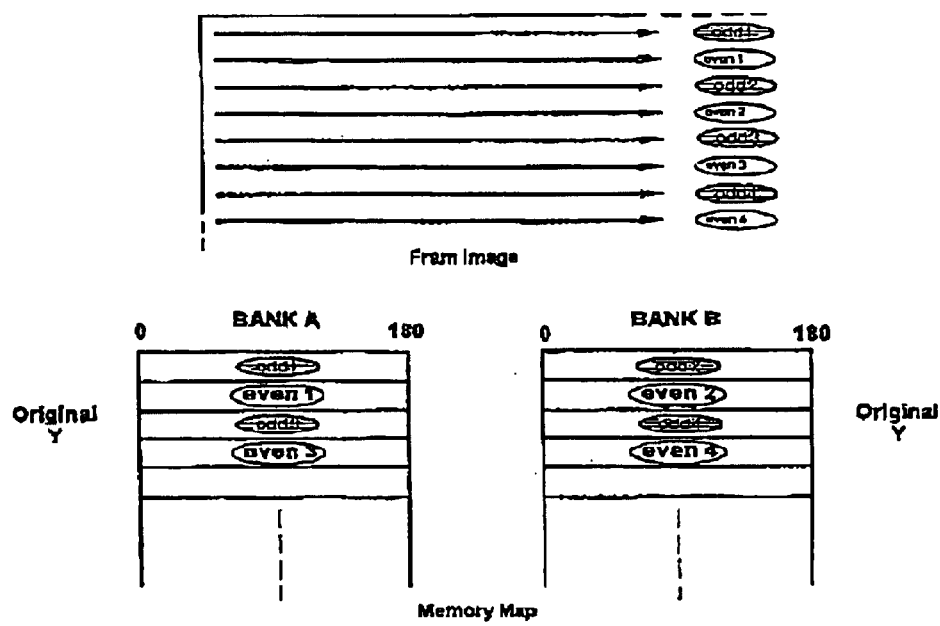
FIG. 22 is a memory map corresponding to a frame illustrated in order to explain procedures of the storage module storing data input from an input module.

FIG. 22 is a memory map corresponding to a frame illustrated in order to describe processes of storing data input from the input module in the storage module. Referring to FIG. 22, processes of storing data input from the input module in the storage module according to the present invention will now be described in detail.

Because the bus of the data of the storage module according to the present invention has 32 bits, 180 columns are required in order to store 720 pixels. In the storage module, 180 columns are stored in each bank having 256 columns, and a row of a screen is stored in a row of a bank. The data of an original image (4:2:2) processed by and input from the input module is stored in the storage module in the row order of an image regardless of the type of frame image. An image is formed of a total of 480 rows and two rows of an image can be stored in a row formed of two banks of the storage module. Therefore, in order to store all of the data, 240 rows are necessary. As a result, in the storage module, a memory region for storing data corresponding to a frame for an original image is 180×240. Such a method is applied to the brightness data and the chrominance data.

Data is stored in a row of a storage module in the order of the row of a screen. When data is read, data is transmitted by searching for a macro block in a frame image according to the encoding method. When the data is read in units of macro blocks in order to perform motion estimation, the data is read in units of fields not in units of frames. Therefore, as illustrated in FIG. 22, first odd line data odd 1 is stored in bank A and continuous first even line data even 1 is stored in bank A and not in bank B. Second odd line data odd 2 and second even line data even 2 are stored in bank B. By doing so, it is not possible to receive the benefits of a bank operation. However, when data is read, it is possible to receive the benefits of the bank operation, because bank A and bank B are alternately read. According to the storage method, some disadvantage occurs when data is stored in the storage module. However, it is possible to receive the benefits of the bank operation in a process of reading data from the storage module in units of fields for motion estimation.

Figure 23:
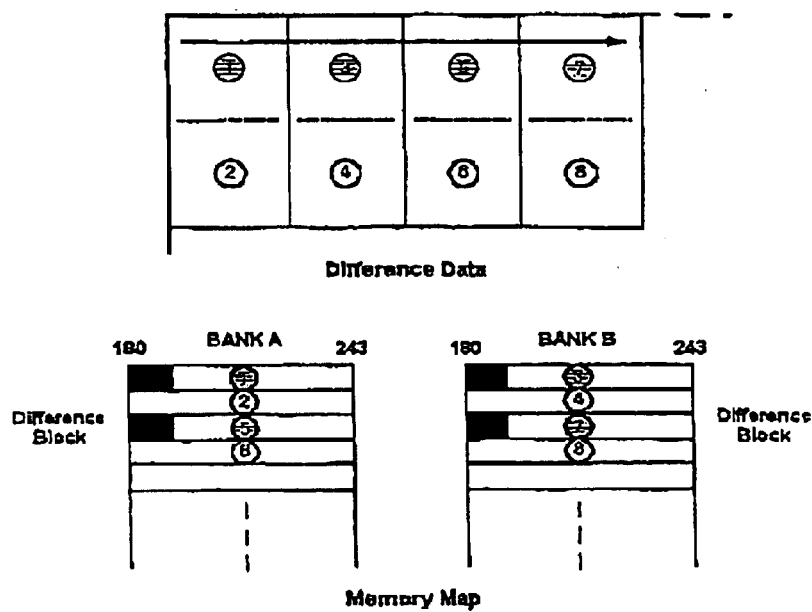
FIG. 23 is a memory map corresponding to a frame illustrated in order to explain procedures of the storage module storing data corresponding to a difference signal input from the motion compensation module.

FIG. 23 is a memory map corresponding to a frame illustrated in order to explain a process of storing data corresponding to a difference signal input from a motion compensation module in the storage module.

720×480÷256 difference signals generated by the motion compensation module according to the present invention exist in a block of the size of 16×16. Because the data bus has 32 bits, when 64 columns are stored in each bank having 256 columns, data corresponding to a macro block is stored in a bank.

When a difference signal is transmitted to the wavelet module, the difference signal must be in the form of line data and not in the form of a macro block. Therefore, when the difference signals are stored, an empty time during motion estimation is sufficient. Meanwhile, when the difference signals are transmitted to the wavelet module, the difference signals are continuously transmitted. Therefore, there is no empty time. As a result, when the difference signals are read in order to transmit the difference signals to the wavelet module, it is more reasonable that the burst mode operation and the bank operation are performed.

As illustrated in FIG. 23, the data ① of a first block and the data ② of a second block are stored in bank A. The data ③ of a third block and the data ④ of a fourth block are stored in bank B. Parts marked with black in the memory map denote data items sequentially read when line data is read. By adopting a method of storing the difference signals, a bank operation can be performed when data is read in the form of a line.

Figure 24A:
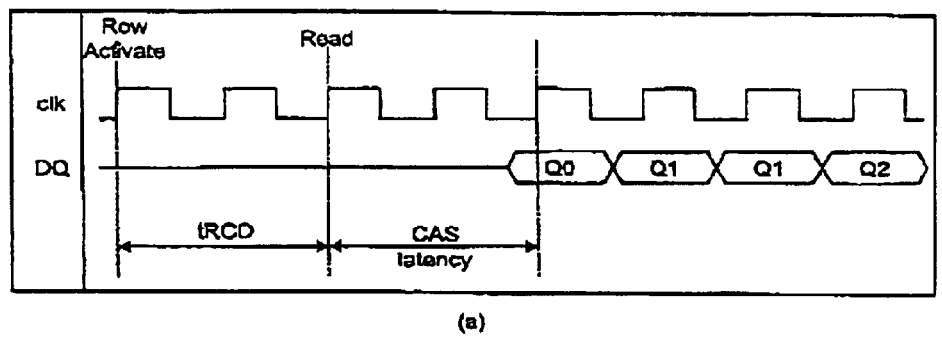
FIGS. 24A and 24B are timing diagrams for reading and writing of a RANDOM access in the storage module.
Figure 24B:
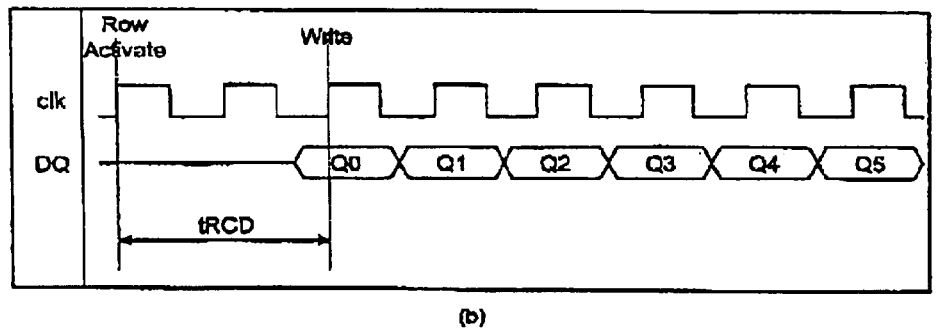

FIGS. 24A and 24B are timing diagrams for reading and writing of a RANDOM access in a storage module according to the present invention.

Referring to FIGS. 24A and 24B, when data is written in the storage module, a time for setting a column, a row, and an address (tRCD=RAS to CAS delay time) is spent. When data is read, more read delay time (read latency or CAS latency) is required excluding the time for setting the column, the row, and the address. In the storage module used according to the present invention, the minimum value is 2 cycles and a reading delay time is restricted by a system clock. According to the present invention, $t_{RCD}$ is set as 2 cycles. That is, the number (1ra) of cycles required during a random access can be obtained according to the following Equation 2 according to a reading and recording burst mode.

1ra (during reading burst mode)=4 cycles=$t_{RCD}$+CASlatency [Equation 2]

1ra (during recording burst mode)=2 cycles=$t_{RCD}$

When the number of data items accessing the storage module is uniform, data can be internally processed without deactivating the storage module from the outside by changing the burst length of the storage module. Accordingly, it is possible to continuously access data, to thus save access time. At this time, data can be continuously accessed during a dual bank. In the case of accessing data changing the burst length, a time for setting a mode is additionally required. However, when the length of the data is uniform and the data is read many times, it is much more advantageous to changing the mode.

Figure 25:
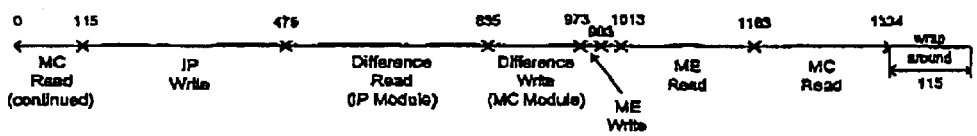
FIG. 25 is an access timing diagram illustrating the storage module.

In the moving picture encoding apparatus according to the present invention, timing of the storage module must be appropriately shared because the input module, the motion compensation module, the motion compensation module, and the output module share a storage module. FIG. 25 is a timing diagram for illustrating the access timing for the storage module. As illustrated in FIG. 25, an overall cycle is formed on the basis of timing required for the motion estimation and the motion compensation for a macro block. The input module and output module receive a time for reading data from the storage module or for recording data in the storage module on the basis of timing for processing a macro block.

Figure 26:
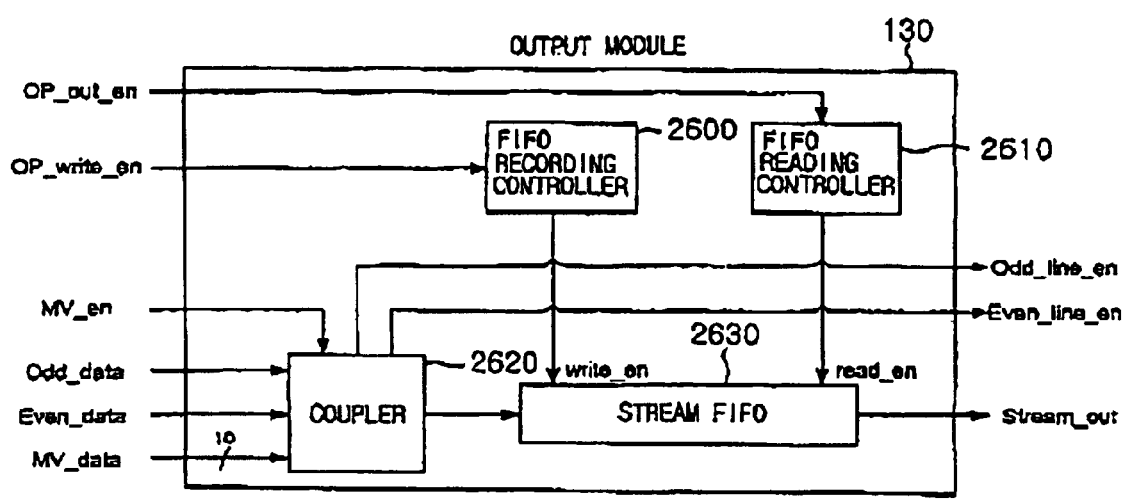
FIG. 26 is a block diagram illustrating an output module in the moving picture encoding apparatus according to the present invention.

FIG. 26 is a block diagram schematically illustrating the inside of the output module 130 (FIG. 1) included in the moving picture encoding apparatus according to the present invention. The output module according to the present invention will now be described with reference to FIG. 26.

As illustrated in FIG. 26, the output module 130 according to the present invention includes a FIFO recording controller 2600, a FIFO reading controller 2610, a coupler 2620, and a stream FIFO 2630. The output module 130 mixes the two input signals transmitted from the wavelet module with the motion vector value transmitted from the storage module and converts the resultant into data of 1-bit length.

The FIFO recording controller 2600 of the output module 130 according to the present invention controls gating of the input of the FIFO and monitors that data overflows from the FIFO. The FIFO reading controller 2610 controls gating of the output of the FIFO and monitors that the FIFO is empty.

The coupler 2620 combines the odd data and the even data transmitted from the wavelet module and the data representing the motion vector with each other to thus create 1-bit length data and outputs the data. A process of creating the data of one bit stream by combining the data transmitted from the wavelet module with the motion vector data is preferably designed so that the motion vector data is repeated according to a transmission period. Because the FIFO on the output end of the wavelet module has the size of storing data for a frame, it is possible to output data by controlling the FIFO from time to time. Therefore, data from the wavelet module is transmitted to the output module by 76 clocks every period. As mentioned above, the data in the form of the bit stream output from the coupler 2620 is stored in the stream FIFO 2630, is synchronized with the output clock, and is finally output.

Figure 27:
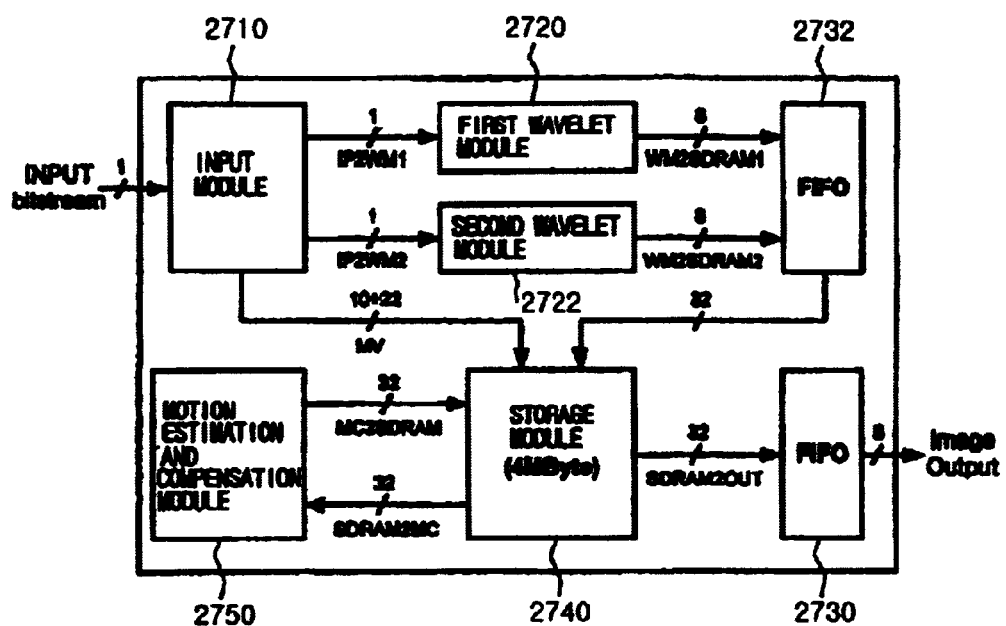
FIG. 27 is a block diagram schematically illustrating a moving picture decoding apparatus according to the present invention.

FIG. 27 is a block diagram illustrating the moving picture decoding apparatus according to the present invention.

As illustrated in FIG. 27, the moving picture decoding apparatus according to the present invention includes an input module 2710, first and second wavelet modules 2720 and 2722, a storage module 2740, a motion estimation and compensation module 2750, an input FIFO 2732, and an output FIFO 2730.

The image data encoded by the above-mentioned encoding apparatus (FIG. 1) is input to the input module 2710 of the moving picture encoding apparatus in units of bit streams. The motion vector among the input data is transmitted to the storage module 2740 and the remaining data is transmitted to the first and second wavelet modules 2720 and 2722, respectively.

The data input to the first and second wavelet modules is inverse wavelet converted and is transmitted to the storage module 2740 through the FIFO 2732.

The storage module 2740 transmits the motion vector transmitted from the input module 2710 and the inverse wavelet converted data transmitted from the FIFO 2732 to the motion estimation and compensation module 2750 and compensates the motion, to thus decode data in the form of the bit stream. The decoded data is finally output through the output FIFO 2730.

According to the present invention, it is possible to reduce memory required for wavelet conversion and to reduce time spent on motion estimation by sharing frame information and block information through one memory and disassembling the information in each field. Also, the hardware implementation can be simplified. Through storing and sharing of motion information identically applied to an image corresponding to two fields using memories.

Furthermore, the moving picture encoding apparatus according to the present invention can be effectively applied to a field, in which a size is large and it is complicated to estimate overall motion at one time, like an image of a large screen. Also, it is possible to effectively combine frame-based image with block-based image information and to encode the information.

What is claimed is:

1. An apparatus for encoding a moving picture by using wavelet transformation based on a frame and motion estimation based on a block comprising:

an input module for receiving original image data;
a wavelet module for wavelet-processing the data received through the input module;
a motion estimation module for obtaining a motion vector;
a motion compensation module for motion compensation by using the motion vector;

a storage module for storing the original image data being transmitted from the input module, the motion rector being transmitted from the motion estimation module, and difference signal data being transmitted from the motion compensation module, and for transmitting the stored data to a corresponding module according to request of the corresponding module;

an output module for outputting one bit stream by coupling the data being inputted from the wavelet module with the motion vector being inputted from the storage module; and a control module for controlling operations of the respective modules, wherein said motion estimation module comprises:

at least one input buffer for storing data being transmitted from the storage module; and an input buffer controller for controlling an output sequence of the data stored in the at least one input buffer.

2. The apparatus of claim 1, wherein the input module comprises an input buffer and output buffer, wherein the input buffer transmits the original image data being inputted into the input module to the storage module, wherein the output buffer reads data corresponding to the difference between a current frame and a previous frame being transmitted from the storage module and transmits the read data to the wavelet module.

3. The apparatus of claim 2, wherein the input buffer of the input module comprises:

a demultiplexer for separating a brightness data and chrominance data from the original image data being inputted into the input module, respectively;

a brightness first-in first-out (FIFO) and a chrominance FIFO for storing the separated brightness data and the separated chrominance data outputting from the demultiplexer, respectively;

recording controller for controlling the brightness FIFO and the chrominance FIFO and an operation of the demultiplexer; and a reading controller for controlling whether data is outputted front the brightness FIFO and the chrominance FIFO.

4. The apparatus of claim 2, wherein the output buffer of the input module comprises:

a brightness FIFO and a chrominance FIFO for respectively separating and storing the brightness data and the separated chrominance data received from the storage module;

a splitter controller for controlling data input from the brightness FIFO and the chrominance FIFO;

a multiplexer for selecting a brightness data and chrominance data to be inputted into the wavelet module; and a FIFO reading controller for controlling outputs of the brightness FIFO and the chrominance FIFO and an operation of the multiplexer.

5. The apparatus of claim 4, wherein the brightness FIFO of the output buffer comprises:

an odd brightness FIFO for storing an odd line brightness data; and an even brightness FIFO for storing an even line brightness data; and wherein the chrominance FIFO of the output buffer comprises:

an odd chrominance FIFO for storing an odd line chrominance data; and an even chrominance FIFO for storing an even line chrominance data.

6. The apparatus of claim 4, wherein the brightness FIFO and the chrominance FIFO, respectively, comprise:

a dual port RAM capable of performing reading and writing operations simultaneously;

a recording controller for generating an address for recording data on the dual port RAM;

a reading controller for generating an address for reading data from the dual port RAM; and a flag controller for indicating whether a state of the dual port RAM is full or empty.

7. The apparatus of claim 1, wherein the motion estimation module comprises:

a delay for delaying an output data from the input buffer according to the input buffer controller;

a multiplexer for transmitting data outputted from the delay; and a motion estimator for obtaining the motion vector by processing data outputted from the multiplexer.

8. The apparatus of claim 7, wherein the data being inputted into the input buffer of the motion estimation module comprises data corresponding to a reference block of a present frame and data corresponding to blocks within a corresponding searching region of a previous frame.

9. The apparatus of claim 7, wherein the motion estimator of the motion estimation module comprises:

a processing element (PE) for calculating and accumulating an absolute error value between the data of the reference block and the data of the searching region; and a shift register array having a two dimensional systolic structure, wherein a pixel value is inputted into the shift register array, and the inputted pixel value of the reference block is inputted again into the PE.

10. The apparatus of claim 9, wherein a width of the register shift array of the motion estimator is identical with a width of the searching region.

11. The apparatus of claim 9, wherein the PE of the motion estimator has a size identical with a length of a row of the reference block.

12. The apparatus of claim 9, wherein the PE of the motion estimator comprises:

a reference input shift register (RSR) for transferring the reference block being inputted during a first early time to a next PE;

an absolute difference computer (ADC) for calculating an absolute difference between data regarding the reference block inputted from the reference input shift register sad data of the searching region;

a first and second delays for transferring data being transferred from a previous PE after holding the transferred data for one clock; and an adder for accumulating data regarding the reference block and data regarding a block of the searching region.

13. The apparatus of claim 12, wherein the processing element further comprises a third delay for tuning a synchronizing between the absolute difference computer and the adder.

14. The apparatus of claim 1, wherein the input buffer of the motion estimation module has a capacity as much as capable of accommodating data necessary for estimating motion of one macro block.

15. The apparatus of claim 1, wherein the motion compensation module comprises;
an input buffer for receiving data of a macro block which is stored in an address of the storage module being made by the motion vector;
a processing element for alternately receiving data regarding a previous frame and data regarding of a present frame and obtaining a difference value between the inputted data; and
an output buffer for outputting a result of the processing element in order for storing the result to the storage module.

16. The apparatus of claim 15, wherein the input buffer of the motion compensation module uses four 512 byte Static Random Access Memories (SRAM).

17. The apparatus of claim 15, wherein the output buffer of the motion compensation module changes order of an 8-bit result data simultaneously outputted from four processing elements and stores the change data in 32-bit format.

18. The apparatus of claim 1, wherein the storage module comprises a synchronous graphic RAM having two banks.

19. The apparatus of claim 1, wherein the storage module comprises a memory capable of storing an image data with respect to one frame transmitted from the input module, an image data with respect to two previous frames to be transmitted to motion estimation module and the compensation module, data corresponding to a motion vector generated as a result of the motion estimation in the motion estimation module, and data corresponding to a difference signal generated as a result of the motion compensation in the motion compensation module.

20. The apparatus of claim 1, wherein the storage module comprises a memory comprised of a first and second banks, and stores an image data in the respective banks transmitted flora the input module by a field unit by storing data of a first odd line and a first even line of the image data in the first bank and data of a second odd line and a second even line of the image data in the second bank.

21. The apparatus of claim 1, wherein the storage module comprises a memory comprised of a first and second banks, and stores the difference signal data being transmitted from the motion compensation module in the respective banks by storing the difference signal data of a first block and second block in the first bank and the difference signal data of a third block and a fourth block in the second bank.

22. The apparatus of claim 1, wherein the output module comprises:
a FIFO recording controller for gating an input of a steam FIFO and monitoring whether the steam FIFO is full or not;
a FIFO read controller for gating an output of the stream FIFO and monitoring whether the stream FIFO is empty or not;
a coupler for coupling the input data inputted from the wavelet module and the motion vector data inputted from the storage module; and
the stream FIFO for storing the data inputted from the coupler.

23. The apparatus of claim 22, wherein the stream FIFO of the output module has a size capable of storing data corresponding to one frame.

24. The apparatus of claim 1, wherein the control module controls on an I mode and P mode, and generates control an address of the storage module and signals with respect to the respective modules.

25. The apparatus of claim 1, wherein the storage module receives and transmits data in 32-bit an input buffer of the input module includes an 8-to-32 converter and an output buffer of the input module includes a 32-to-8 converter.

26. The apparatus of claim 1, wherein the wavelet module comprises a first and second wavelet modules, the first and second wavelet modules process an odd data and even data separately.

27. An encoding and decoding apparatus, comprising:
an encoding module comprising:
an input module for receiving original image data;
a wavelet module for wavelet-processing the data received through the input module;
a motion estimation module for obtaining a motion vector, wherein said motion estimation module comprise at least one input buffer for storing data being transmitted from a storage module; and
a motion compensation module for motion compensation by using the motion vector, wherein the motion estimation module comprises,
at least one input buffer for storing data being transmitted from the data stored in the input buffer;
an input buffer controller for controlling an output sequence of the data stored in the input buffer;
a delay for delaying an output data from the input buffer according to the input buffer controller;
a multiplexer for transmitting data outputted from the delay; and
a motion estimator for obtaining the motion vector by processing data outputted from the multiplexer; and
a decoding module.

28. The apparatus of claim 27, wherein said decoding module comprises:
an input module for receiving the encoded image signal of the one bit-stream type;
a wavelet module for receiving a difference signal among the image signal from the input module and reversely wavelet-transforming the difference signal;
a FIFO for storing a signal outputted from the wavelet module;
a storage module to which a motion vector among the image signal is transmitted from the input module and the reverse-wavelet-transformed difference signal is transmitted from the FIFO;
a motion compensation module for compensating a motion by using the motion vector and the difference signal transmitted from the storage module; and
an output buffer for finally outputting an image signal decoded by the motion compensation module received from the storage module.

29. The apparatus of claim 27, wherein said encoding module further comprises:
a storage module for storing the original image data being transmitted from the input module, the motion vector being transmitted from the motion estimation module, and difference signal data being transmitted from the motion compensation module, and for transmitting the stored data to a corresponding module according to request of the corresponding module;
an output module for outputting one bit stream by coupling the data being inputted from the wavelet module with the motion vector being inputted from the storage module; and
a control module for controlling operations of the respective modules.

30. An apparatus for encoding a moving picture by using wavelet transformation based on a frame and motion estimation based on a block comprising an input module for receiving original image data;

a wavelet module for wavelet-processing the data received through the input module;

a motion estimation module for obtaining a motion vector;

a motion compensation module for motion compensation by using the motion vector;

a storage module for storing the original image data being transmitted from the input module, the motion vector being transmitted from the motion estimation module, and difference signal data being transmitted from the motion compensation module, and for transmitting the stored data to a corresponding module according to request of the corresponding module;

an output module for outputting one bit stream by coupling the data being inputted from the wavelet module with the motion vector being inputted from the storage module; and a control module for controlling operations of the respective modules, wherein the input module comprises an input buffer and output buffer;

wherein the input buffer transmits the original image data being inputted into the input module to the storage module;

wherein the output buffer reads data corresponding to the difference between a current frame and a previous frame being transmitted from the storage module and transmits the read data to the wavelet module; and wherein the input buffer of the input module comprises a demultiplexer for separating a brightness data and chrominance data from the original image data being inputted into the input module, respectively.

31. The apparatus of claim 30, wherein the input buffet of the input module comprises:

a brightness first-in first-out (FIFO) and a chrominance FIFO for storing the separated brightness data and the separated chrominance data outputting from the demultiplexer, respectively;

a recording controller for controlling the brightness FIFO and the chrominance FIFO, and an operation of the demultiplexer; and a reading controller for controlling whether data is outputted from the brightness FIFO and the chrominance FIFO.

32. The apparatus of claim 30, wherein the output buffer of the input module comprises:

a brightness FIFO and a chrominance FIFO for respectively separating and storing the brightness data and the separated chrominance data received from the storage module;

a splitter controller for controlling data input from the brightness FIFO and the chrominance FIFO;

a multiplexer for selecting a brightness data and chrominance data to be inputted into the wavelet module; and a FIFO reading controller for controlling outputs of the brightness FIFO and the chrominance FIFO and an operation of the multiplexer.

33. The apparatus of claim 32, where the brightness FIFO of the output buffer comprises:

an odd brightness FIFO for storing an odd line brightness data;

an even brightness FIFO for storing an even line brightness data; and wherein the chrominance FIFO of the output buffer comprises:

an odd chrominance FIFO for storing an odd line chrominance data; and an even chrominance FIFO for storing an even line chrominance data.

34. The apparatus of claim 32, wherein the brightness FIFO and the chrominance FIFO, respectively, comprises:

a dual port RAM capable of performing reading end writing operations simultaneously;

a recording controller for generating an address for recording data on the dual port RAM;

a reading controller for generating an address for reading data from the dual port RAM; and a flag controller for indicating whether a state of the dual port RAM is full or empty.

35. An apparatus for encoding a moving picture by using wavelet transformation based on a frame and motion estimation based on a block comprising:

an input module for receiving original image data;

a wavelet module for wavelet-processing the data received through the input module;

a motion estimation module for obtaining a motion vector;

a motion compensation module for motion compensation by using the motion vector;

a storage module for storing the original image data being transmitted from the input module, the motion vector being transmitted from the motion estimation module, and difference signal data being transmitted from the motion compensation module, and for transmitting the stored data to a corresponding module according to request of the corresponding module;

an output module for outputting one bit stream by coupling the data being inputted from the wavelet module with the motion vector being inputted from the storage module, wherein the output module comprises:

a FIFO recording controller for gating an input of a stream FIFO and monitoring whether the stream FIFO is full or not; and FIFO read controller for gating an output of the stream FIFO and monitoring whether the stream FIFO is empty or not; and a control module for controlling operations of the respective modules.

36. The apparatus of claim 35, wherein the output module comprises:

a coupler for coupling the input data inputted from the wavelet module and the motion vector data inputted from the storage module; and the stream FIFO for storing the data inputted from the coupler.

* * * * *